United States Patent
Golle

(10) Patent No.: US 8,499,723 B2
(45) Date of Patent: Aug. 6, 2013

(54) COUPLED GENERATOR AND PISTON ENGINE TO GENERATE ELECTRICAL POWER AND HEAT

(75) Inventor: Hermann Golle, Dresden (DE)

(73) Assignee: Golle Motor GmbH, Dresden (DE)

( * ) Notice: Subject to any disclaimer, the term of this patent is extended or adjusted under 35 U.S.C. 154(b) by 333 days.

(21) Appl. No.: 12/861,384

(22) Filed: Aug. 23, 2010

(65) Prior Publication Data

US 2011/0042963 A1 Feb. 24, 2011

(30) Foreign Application Priority Data

Aug. 24, 2009 (DE) .................. 10 2009 038 870

(51) Int. Cl.
*H02K 1/04* (2006.01)
(52) U.S. Cl.
USPC ................................. 123/3; 290/1 A
(58) Field of Classification Search
USPC ....................................... 290/1 A
See application file for complete search history.

(56) References Cited

U.S. PATENT DOCUMENTS

| | | | | |
|---|---|---|---|---|
| 1,477,591 A | * | 12/1923 | Prescott | 123/747 AA |
| 1,611,283 A | * | 12/1926 | Scott | 123/74 AP |
| 2,376,160 A | * | 5/1945 | Marburg | 123/41.39 |
| 2,559,134 A | * | 7/1951 | Steele | 184/11.1 |
| 2,715,685 A | * | 8/1955 | Brown | 290/1 A |
| 3,405,293 A | * | 10/1968 | Burkett et al. | 310/74 |
| 4,647,835 A | * | 3/1987 | Fujikawa et al. | 322/1 |
| 4,936,269 A | * | 6/1990 | Beaty | 123/193.4 |
| 5,118,978 A | * | 6/1992 | Matsumoto et al. | 310/153 |
| 5,479,894 A | * | 1/1996 | Noltemeyer et al. | 123/74 AC |
| 5,797,311 A | * | 8/1998 | Gasthuber et al. | 92/158 |
| 6,050,234 A | * | 4/2000 | Hannoosh | 123/193.1 |
| 6,135,070 A | * | 10/2000 | Crandall | 123/65 R |
| 2001/0029915 A1 | * | 10/2001 | Kawamoto | 123/90.31 |

FOREIGN PATENT DOCUMENTS

| | | |
|---|---|---|
| DE | 3511123 A1 | 2/1986 |
| DE | 9405466 U1 | 6/1994 |
| DE | 4408719 C1 | 7/1995 |
| DE | 29513958 U1 | 1/1997 |
| DE | 19704786 C1 | 7/1998 |
| DE | 10152748 A1 | 5/2003 |
| DE | 10339564 A1 | 3/2004 |
| DE | 102005061165 A1 | 6/2007 |
| DE | 102006015645 A1 | 10/2007 |
| DE | 102008017142 A1 | 10/2008 |
| DE | 102009017609 A1 | 10/2010 |

* cited by examiner

*Primary Examiner* — Joseph Waks
(74) *Attorney, Agent, or Firm* — Heslin Rothenberg Farley & Mesiti P.C.

(57) ABSTRACT

A drive combination for generation of electrical power and heat includes a piston engine coupled to a generator. A connecting rod of an engine body of the engine is directly linked to an overhung crank, and the crank is a component of a generator shaft of the generator, so that the generator shaft forms the crankshaft of the engine body.

9 Claims, 4 Drawing Sheets

COUPLED GENERATOR AND PISTON ENGINE TO GENERATE ELECTRICAL POWER AND HEAT

CROSS REFERENCE TO RELATED APPLICATIONS

Figure 1:
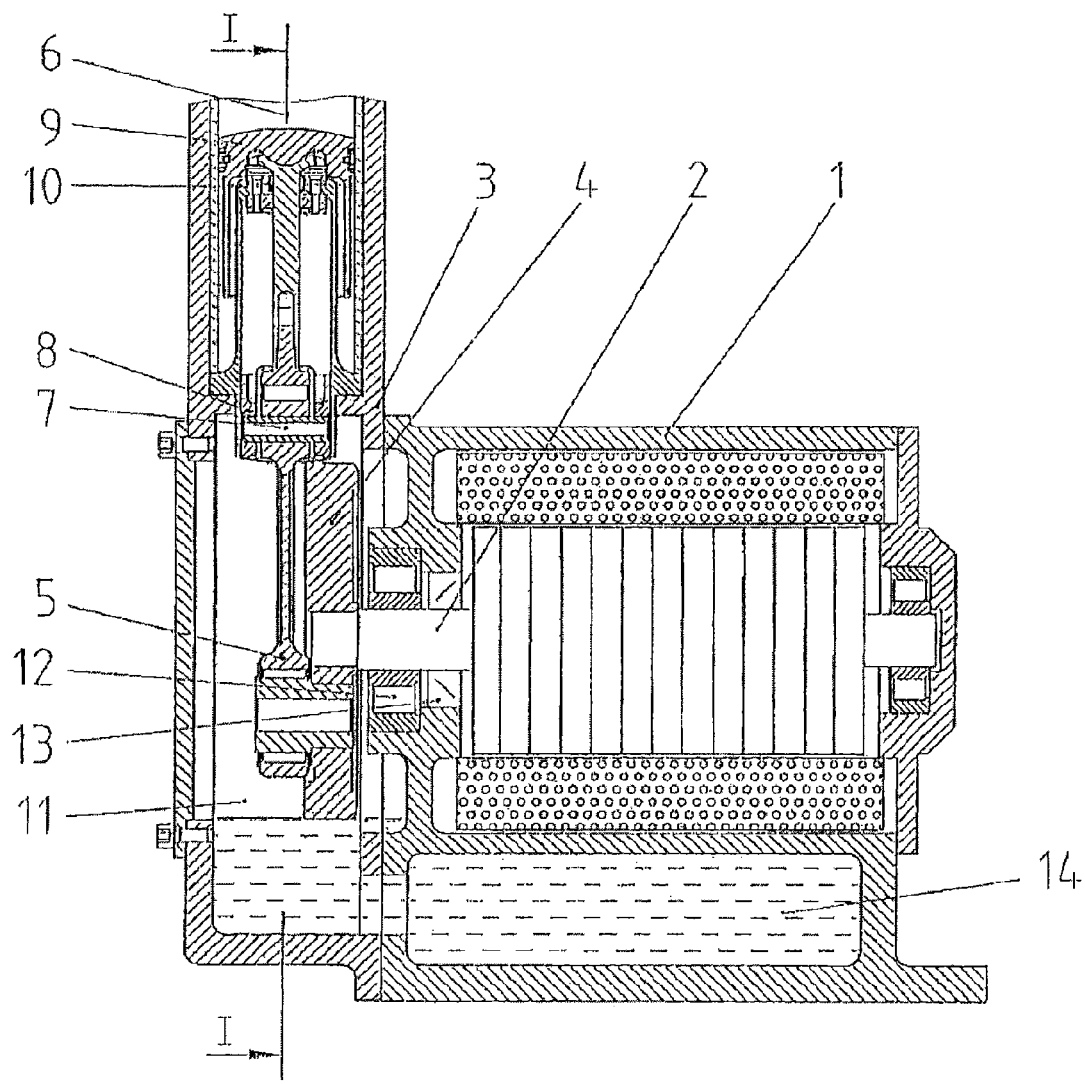

This application claims priority of German application No. 10 2009 038 870.2-13, filed on Aug. 24, 2009, the entire disclosure of which is hereby incorporated herein by reference.

BACKGROUND ART

The invention concerns a combination of a piston engine and an electrical generator, as used for combined heat and power plants and other stationary or mobile current and heat generators, for example, also for so-called range extenders in electrically driven vehicles.

Such motor-generator combinations are already known in many variants. DE 295 13 958 describes the classic design of such units, in which the motor and generator are independent machines and connected to each other by a clutch. DE 10 2005 061 165 A1, DE 4408 719 C1, DE 103 39 564 A1, and a number of other inventions are designed in this way, so that both machines have their own housing and bearings of their rotating elements.

In other invention proposals, for example, vehicle flywheels are described with incorporated clutches and electric machines (DE 197 04786 C1, DE 101 52 748 A1) or special gear mechanisms are arranged between the motor and the generator, in order to alter the transmission ratios (DE 10 2008 017 142 A1).

In other known variants, the motor-generator unit is held in a housing filled on all sides with water (DE 9405 466) or specially configured housings of the unit are described (DE 3511 123 C2).

BRIEF SUMMARY OF INVENTION

The underlying task of the invention is to devise, for stationary and mobile applications, an inexpensive and stable, but also light and space-saving (for mobile applications) drive combination.

This task is solved according to the invention in that the generator shaft simultaneously represents the crankshaft of the piston engine, so that the connecting rod of the engine is linked to an overhung crank firmly connected to the generator shaft.

The engine can then be designed in the simplest form and for low powers as a 1-cylinder spark ignition or diesel engine.

However, it can also be connected in the manner just described to the generator as a multi-cylinder engine in V- or star form, as a boxer engine or opposed piston engine, or also hot air engine.

The engine housing is flanged to the generator housing by easily releasable connections (screws, clamps) and is therefore easily replaceable.

In the case of a multi-cylinder engine, an auxiliary bearing on the side of the combination lying opposite the generator can support take up of the bearing forces. This auxiliary bearing is expediently arranged in a cover releasable from the engine housing.

The invention is presented below on several practical examples, in which additional features according to the invention are shown in the drawings.

BRIEF DESCRIPTION OF THE DRAWING FIGURES

Figure 2:
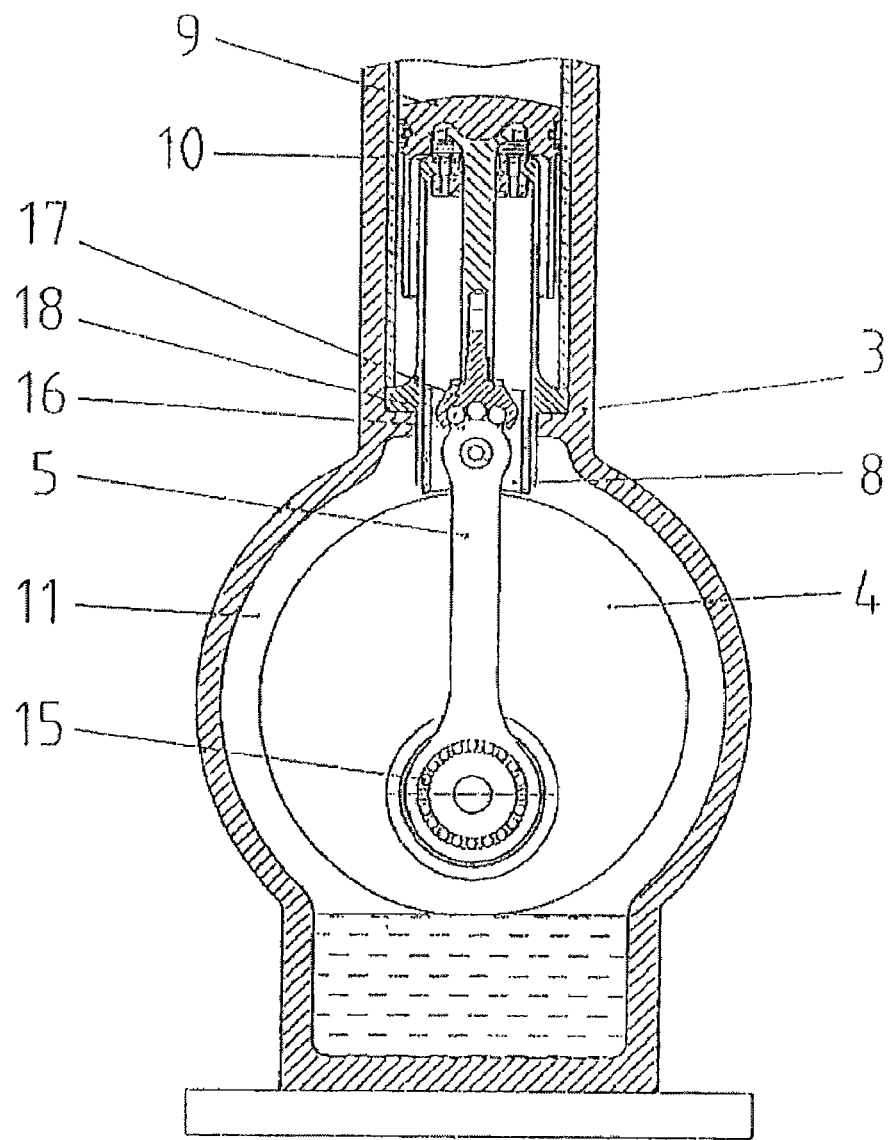
Figure 3:
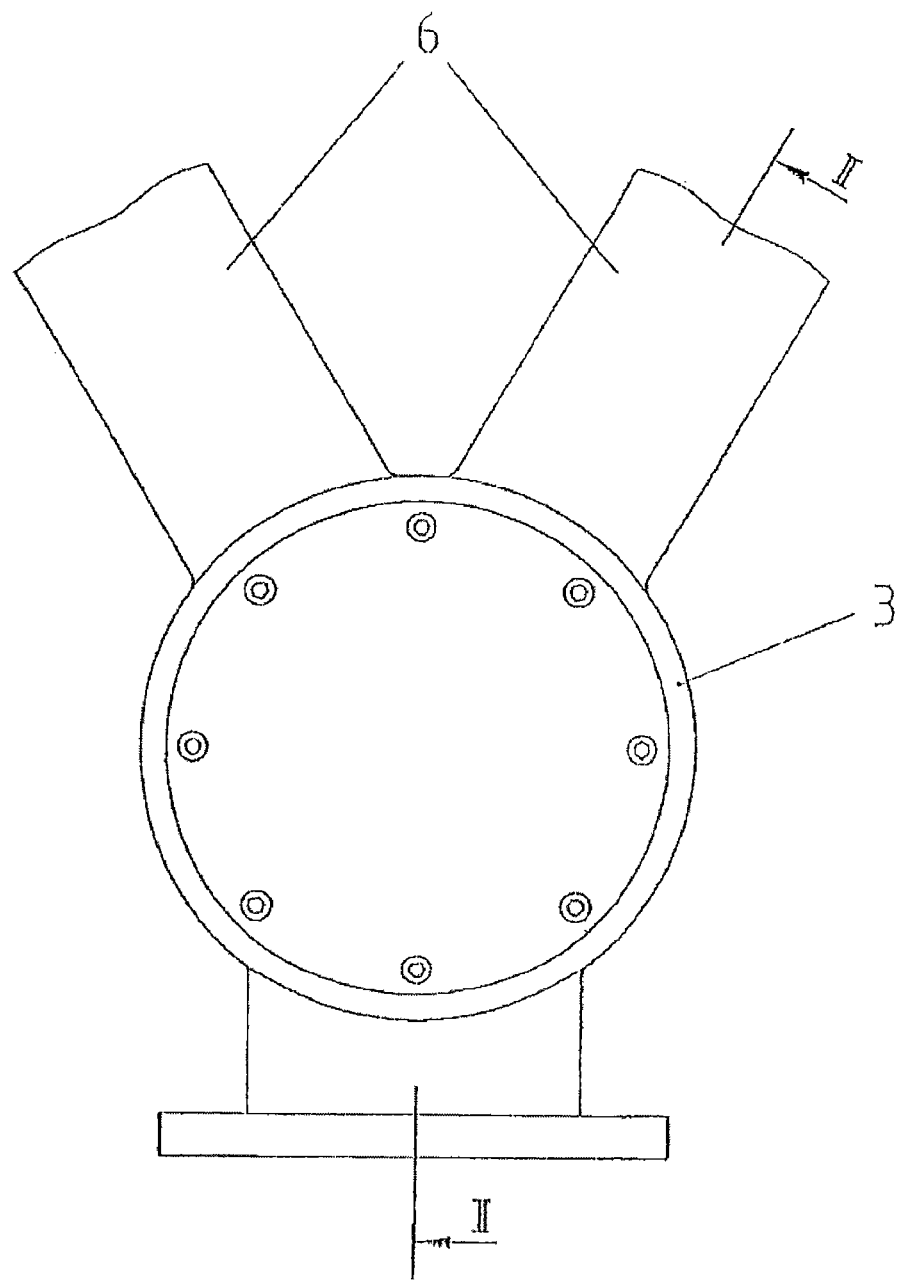
Figure 4:
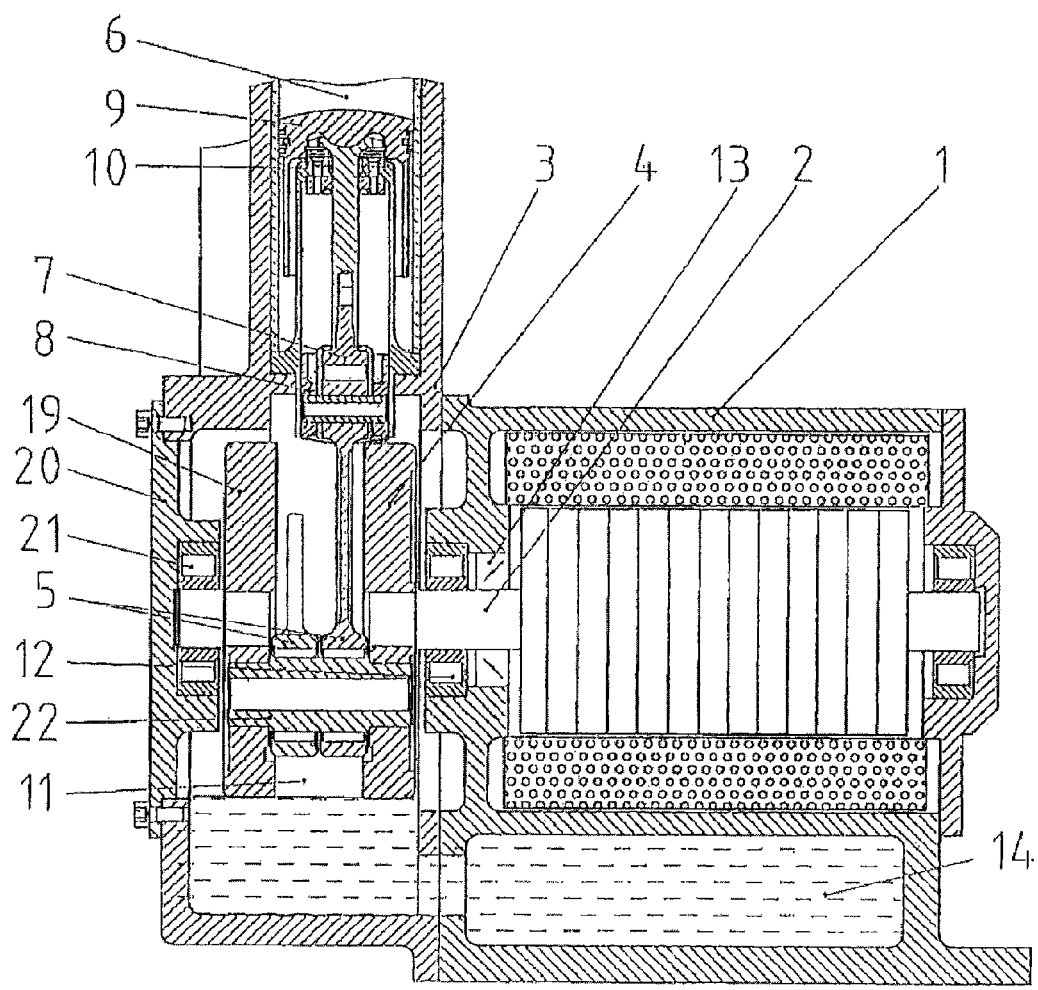

In the drawings:
FIG. 1 shows a longitudinal section through a drive combination,
FIG. 2 shows a section along line I-I in FIG. 1,
FIG. 3 shows a front view with a V-engine,
FIG. 4 shows a longitudinal section along line II-II in FIG. 3.

DETAILED DESCRIPTION

FIG. 1 shows a generator housing 1, in which the generator shaft 2 is supported on both sides. The engine housing 3 is easily releasable on the generator housing 1, but firmly flanged. The generator shaft 2 on the engine side has an overhung crank 4, to which the connecting rod 5 is directly linked. This connecting rod 5 is a component of the actual engine body 6, which can be designed as a piston engine in a variety of designs with internal or external combustion. In the example the drive mechanism 7 of this engine body is shown. The upper part that controls charge exchange (not shown) (cylinder head), as already mentioned, can be designed according to the two-stroke or four-stroke method or according to the hot air principle (Stirling engine).

A preferred variant of the drive mechanism 7 is the design with crosshead 8 and piston/cylinder group operating free of oil according to DE 10 2006 015 645 A1 and DE 10 2009 017 609. This special design avoids all pollutant emissions from the burning-off oil film, which can amount to 30%. At the same time, oil- and gas-tight separation between the piston/cylinder group 9 and the engine space 11 occurs by means of a rod seal 10, so that no blow-by gases can enter the engine space 11.

The lubricant present there to lubricate all engine parts is therefore neither consumed nor contaminated, so that even during long operating times, no oil consumption occurs and no oil change is necessary. The strongly loaded roller bearing 12 of the generator shaft 2 situated on the overhung crank 4 is involved in this lubrication process, so that the shaft seal 13 is arranged on the side facing the generator.

The generator housing 1 is designed in this lower part as a hollow element 14 and connected to the engine space 11, so that it serves as lubricant reservoir, together with the latter. Cooling hoses not shown here, arranged in the hollow element 14, can serve to take off inadmissibly high heat in the lubricant.

FIG. 2 shows in cross section the engine housing 3 with the overhung crank 4 and connecting rod 5. The piston/cylinder group 9 operating free of oil is separated hermetically from the engine space 11 by the rod seal 10. Lubrication of the entire engine occurs by light contact of the overhung crank 4 on the surface of the oil filling, so that the connecting rod bearings 15 and 16, the crosshead 8 and the roller bearing 12 (FIG. 1) are sufficiently lubricated by centrifugal lubrication. With special means according to the invention, the upper connecting rod bearing 16 is then designed by securing several roller bodies 18 in a bearing head 17, which operate together with the low-wear outer contour of the connecting rod 5.

FIG. 3 shows the drive combination with a V-engine in the front view.

The engine housing 3 here has two engine bodies 6, which are at an angle to each other and operate in a common drive mechanism.

This is shown in FIG. 4. The overhung crank 4 is formed here by means of cam plate 19 to a one-stroke crankshaft. This is supported in housing cover 20 by a second roller bearing 21.

The two connecting rods 5, as is common in such multi-cylinder engines, are linked to the common connecting rod journal 22 of the single-stroke crankshaft.

This design, with the cam plate 19 and the second roller bearing 21, can naturally also be used in the case of a one-cylinder engine. The second roller bearing 21 can also be dimensioned smaller, i.e., as an auxiliary bearing.

The invention describes an innovative product, which can be used for all applications for the generation of electrical current and heat, especially combined heat and power plants and electromobility with low pollution and maintenance.

The invention claimed is:

1. Drive combination for generation of electrical power and heat, comprising a piston engine coupled to a generator, wherein a connecting rod of an engine body of the engine is directly linked to an overhung crank, and the crank is a component of a generator shaft of the generator, so that the generator shaft forms a crankshaft of the engine body, wherein an engine space and a hollow element of a housing of the generator are connected to each other by openings and serve as a lubricant reservoir.

2. Drive combination according to claim 1, wherein a housing of the engine is firmly but releasably flanged to a housing of the generator.

3. Drive combination according to claim 2, wherein the engine housing and the engine body are in the form of a V-, star-, boxer- or opposed piston engine.

4. Drive combination according to claim 3, further comprising a roller bearing situated between the generator housing and the engine housing, the roller bearing belonging to the engine housing and drive mechanism, whereby a shaft seal is arranged on a generator side.

5. Drive combination according to claim 1, further comprising an upper connecting rod bearing in the form of a bearing head provided with several roller bodies that cooperates with a low-wear outer contour of the connecting rod.

6. Drive combination according to claim 1, wherein the overhung crank forms a single-stroke crankshaft for connection of the connecting rod with a cam plate, a connecting rod journal and a roller bearing.

7. Drive combination according to claim 6, wherein the roller bearing is firmly connected to a housing of the engine, and further comprising a releasable engine housing cover.

8. Drive combination according to claim 6, wherein lubrication of all engine parts occurs by contact of the overhung crank and the cam plate with an oil level.

9. Drive combination according to claim 1, further comprising a crosshead located between a piston/cylinder group operating free of oil and an engine space of the engine, and a rod seal located between the piston/cylinder group and the engine space providing oil- and gas-tight separation.

* * * * *